US011495030B1

(12) United States Patent
Kimchi et al.

(10) Patent No.: US 11,495,030 B1
(45) Date of Patent: Nov. 8, 2022

(54) SYSTEMS AND METHODS FOR CREATING AN OCCUPANCY MAP BASED ON AN OBJECTIVE FUNCTION

(71) Applicant: Amazon Technologies, Inc., Seattle, WA (US)

(72) Inventors: Gur Kimchi, Seattle, WA (US); Amir Navot, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 405 days.

(21) Appl. No.: 16/712,946

(22) Filed: Dec. 12, 2019

(51) Int. Cl.
| G06V 20/59 | (2022.01) |
| G06V 20/64 | (2022.01) |
| B64C 39/02 | (2006.01) |
| G05D 1/00 | (2006.01) |
| G01N 5/00 | (2006.01) |
| G05D 1/10 | (2006.01) |

(52) U.S. Cl.
CPC ............ G06V 20/59 (2022.01); B64C 39/024 (2013.01); G01N 5/00 (2013.01); G05D 1/106 (2019.05); G06V 20/64 (2022.01); *B64C 2201/123* (2013.01)

(58) Field of Classification Search
CPC ...... G06V 20/59; G06V 20/64; B64C 39/024; B64C 2201/123; B64C 39/02; G01N 5/00; G05D 1/106; G05D 1/00
See application file for complete search history.

(56) References Cited

U.S. PATENT DOCUMENTS

| 10,170,006 | B2 * | 1/2019 | Kline ................... G08G 5/0013 |
| 10,181,152 | B1 * | 1/2019 | Rao ......................... G06Q 10/08 |
| 10,402,774 | B1 * | 9/2019 | Phillips ................... G06N 20/00 |
| 2014/0032034 | A1 * | 1/2014 | Raptopoulos ...... H04B 7/18506 701/25 |
| 2017/0154302 | A1 * | 6/2017 | Streebin .................. G06T 17/30 |
| 2018/0260607 | A1 * | 9/2018 | Gopalan ................. G06T 17/05 |
| 2018/0281954 | A1 * | 10/2018 | Atchley .................... B64D 1/22 |
| 2018/0290764 | A1 * | 10/2018 | Mcmillian ............. G08G 5/045 |
| 2019/0039731 | A1 * | 2/2019 | Marcath .................... B64F 1/10 |
| 2019/0102730 | A1 * | 4/2019 | Giorgi ..................... H04L 67/12 |
| 2019/0196512 | A1 * | 6/2019 | Blake ..................... G05D 1/104 |
| 2019/0236365 | A1 * | 8/2019 | Speasl .................... G06V 20/13 |
| 2020/0167722 | A1 * | 5/2020 | Goldberg ............. B64C 39/024 |
| 2020/0355811 | A1 * | 11/2020 | Meng .................... G01S 7/4972 |
| 2020/0356114 | A1 * | 11/2020 | Uçar .................... G08G 5/0021 |
| 2021/0035064 | A1 * | 2/2021 | Nishikawa ............. G16H 40/67 |
| 2021/0319398 | A1 * | 10/2021 | Streebin ............ G06Q 10/0834 |

* cited by examiner

*Primary Examiner* — Yonel Beaulieu
(74) *Attorney, Agent, or Firm* — Athorus, PLLC

(57) ABSTRACT

Described are systems and methods to utilize an objective function of an aerial vehicle in constructing and/or updating an occupancy map. The described systems and methods can determine whether to include, add, and/or remove an object from an occupancy map based on one or more confidence score(s) that can be determined for the presence (or absence) of an object at a given location. The confidence score for an object at a given location can be determined, for example, based on various sources of information, which can each be provided different weights, parameters, thresholds, etc. based on the objective function of the aerial vehicle.

20 Claims, 12 Drawing Sheets

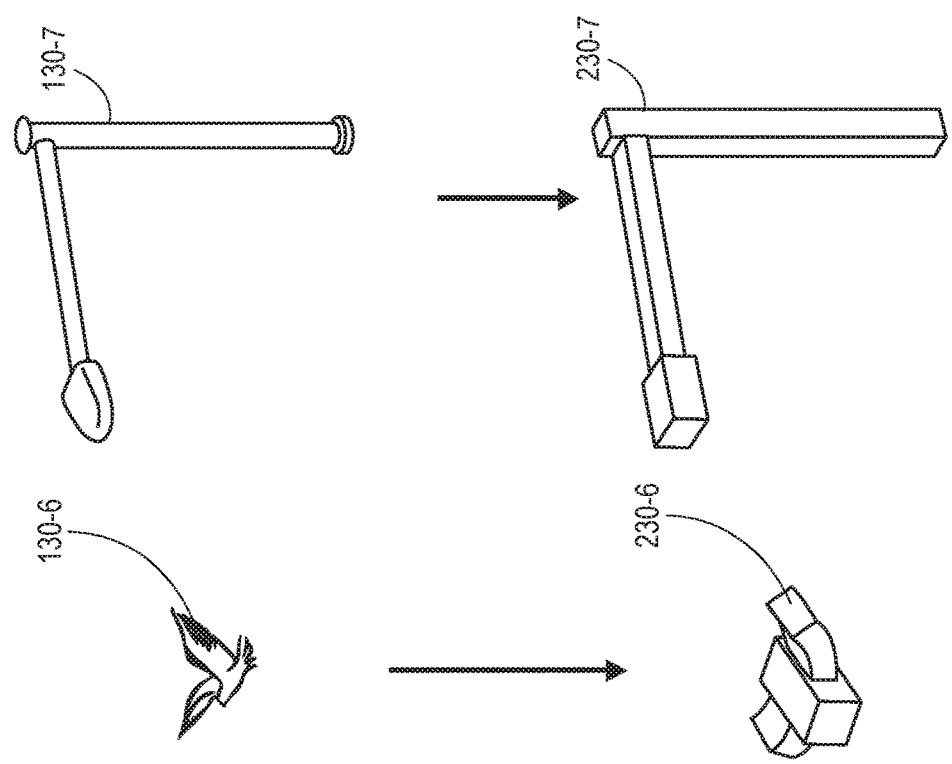

SYSTEMS AND METHODS FOR CREATING AN OCCUPANCY MAP BASED ON AN OBJECTIVE FUNCTION

BACKGROUND

Unmanned aerial vehicles (UAV) typically require accurate mappings of the environments in which they operate to ensure safe and efficient operation. Inaccurate mappings can result in accidents and collisions, which can result in destruction/damage of property, as well as injuries to people. Although mapping areas with only static elements that do not move or change may not be difficult, mapping dynamic areas that include moving objects, newly introduced objects, and removal of older objects can be more complex, and can result in mapping errors and inaccuracies.

BRIEF DESCRIPTION OF THE DRAWINGS

FIG. 2D is a schematic diagram of an exemplary three-dimensional bounding shape for an animal object type, in accordance with embodiments of the present disclosure.

FIG. 2E is a schematic diagram of an exemplary three-dimensional bounding shape for a structure object type, in accordance with embodiments of the present disclosure.

Figure 1:
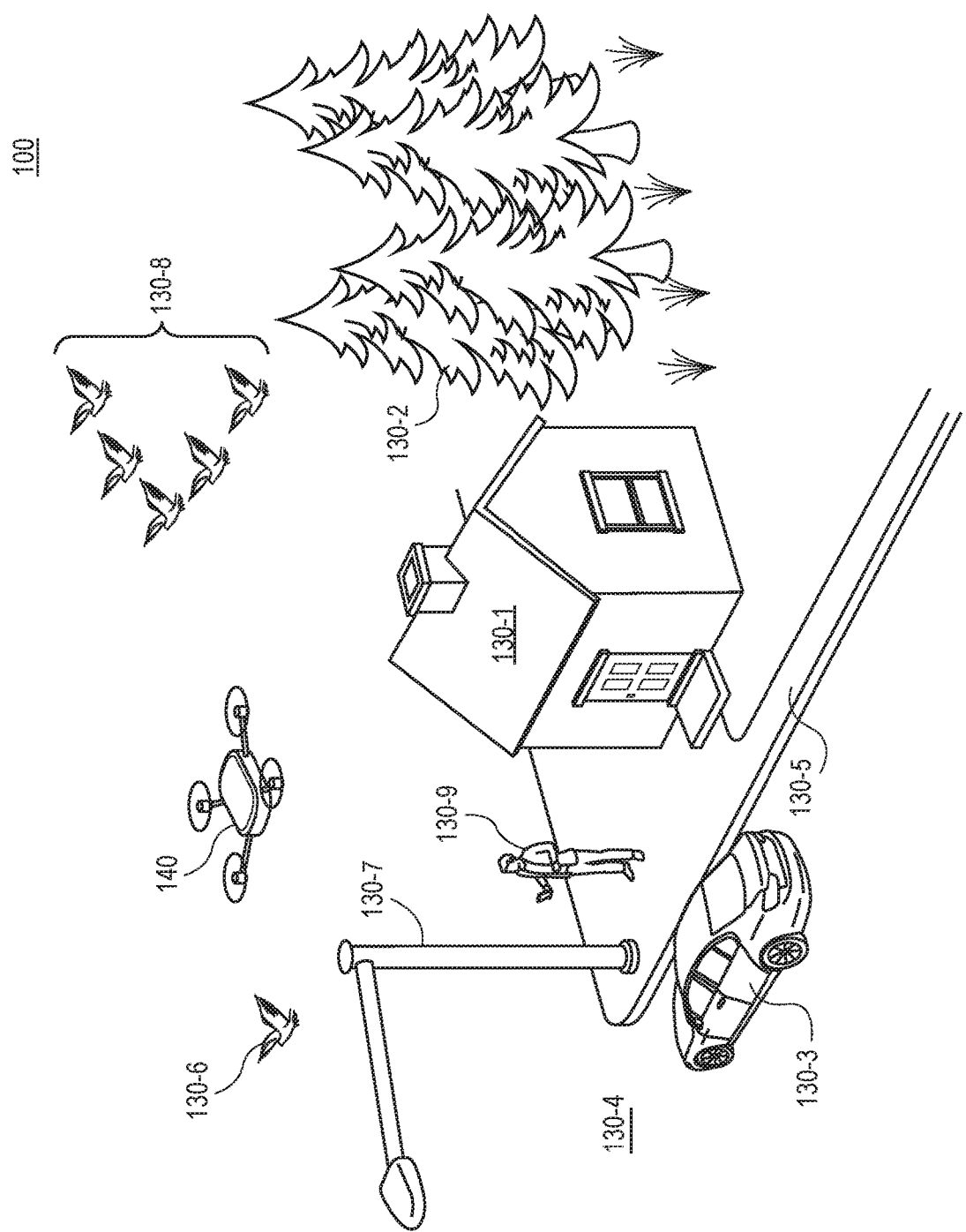
FIG. 1 is a schematic diagram of an exemplary environment in which an aerial vehicle may operate, in accordance with embodiments of the present disclosure.

While implementations are described herein by way of example, those skilled in the art will recognize that the implementations are not limited to the examples or drawings described. It should be understood that the drawings and detailed description thereto are not intended to limit implementations to the particular form disclosed but, on the contrary, the intention is to cover all modifications, equivalents and alternatives falling within the spirit and scope as defined by the appended claims.

DETAILED DESCRIPTION

As is set forth in greater detail below, embodiments of the present disclosure can provide systems and methods for constructing occupancy maps for vehicles, such as an unmanned aerial vehicle ("UAV"), based at least in part on an objective function, which may include directives and commands directing operation of the UAV. Occupancy maps can include representations of buildings, trees, people, roads, bridges, topology, power lines, etc. to facilitate safe operation of a UAV in an environment. Occupancy maps can be constructed using information from a multitude of different sources. For example, publicly available maps, such as two-dimensional ("2D") parcel maps, three-dimensional ("3D") building maps, cell phone and antenna tower maps, road, bridge, and freeway maps, topology maps, terrain maps, etc., may be obtained and processed to generate 3D vector maps of objects within an environment. In addition, data from aerial vehicles, satellites, etc., may also be processed and used to generate 3D maps of objects within the environment. However, although occupancy maps can provide representations of objects in an environment in which a UAV may be operating to facilitate safe operation of the UAV, they are not necessarily customized for a given objective function of a UAV.

Embodiments of the present disclosure provide systems and methods to utilize an objective function of a UAV in constructing and/or updating an occupancy map. According to certain embodiments, the inclusion, addition, and/or removal an object from an occupancy map may be determined based on one or more confidence score(s) that can be determined for the presence (or absence) of an object at a given location. The confidence score for an object at a given location can be determined, for example, based on various different factors, such as, information from an existing occupancy map, detection (or non-detection) of the object at the location by sensors on the UAV, the type of detected (or undetected) object, the type of sensor that performed the detection (or non-detection), the number of sensors that performed the detection (or non-detection), etc. In combining the various sources of information to determine whether the object should be included, added, and/or removed from the occupancy map, each source of information can be provided different weights, parameters, thresholds, etc. For example, the more reliable sources of information based on the object type, object dynamics (e.g., whether object is moving, as well as trajectory, acceleration, velocity, etc. of object), sensor type, etc. in view other considerations (e.g., weather, etc.) can be provided higher weights, whereas the more unreliable sources of information on the object type, object dynamics, sensor type, etc. in view other considerations (e.g., weather, etc.) can be provided lower weights. Additionally, if the detection (or non-detection) includes corroborating information (e.g., more than one sensor), the weight provided for such information can be adjusted accordingly (e.g., a higher weight for more corroboration and a lower weight for no corroboration). Further, the confidence scores can be scaled based on an assessment of the risk of collision with a detected object. For example, detection of a leaf may be considered a low risk even if a collision were to occur, whereas collision with power lines or a building may be considered a high-risk collision. The one or more confidence scores can then be compared to threshold value to determine whether the objects should be included, added, and/or removed from an occupancy map. Alternatively, the confidence score associated with the presence of an object can be compared with the confidence score associated with the absence of the object in making a determination whether to include, add, and/or remove the object from the occupancy map.

In the context of an objective function, the objective function can, for example, adjust and/or influence the parameters, values, weights, thresholds, etc. in determining a confidence score and/or the threshold values in creating and/or updating an occupancy map to ensure that the occupancy map is customized, so that it is consistent with the directives and commands of the objective function that is dictating the operation of the UAV. According to embodiments of the present disclosure, an objective function can influence the operation of a UAV in situations where a UAV may receive conflicting information regarding the presence of an object at a given location. For example, one source of information (e.g., historical occupancy map, sensor, etc.) can indicate a presence of an object at a location while another source of information (e.g., historical occupancy map, sensor, etc.) can indicate that no such object exists at that same location. Accordingly, an objective function can be utilized to resolve the conflicting information by scaling the weights, parameters, values, thresholds, etc. accordingly to determine the confidence score(s) in deciding whether to include (or remove) the presence of the object at that location in an occupancy map so that the constructed occupancy map aligns with the goals of the objective function.

According to one aspect of the present disclosure, a UAV may have an objective function that prioritizes collision avoidance. Accordingly, in resolving conflicting information regarding the presence of an object, such an objective function may provide weights, parameters, values, thresholds, etc. to yield a confidence score that favors including the presence of such an object in an occupancy map. Including the object in the occupancy map may remove the risk of a collision at the expense of potentially creating a phantom object in the occupancy map that does not exist in the actual environment in which the UAV is operating. The objective function may also control removal of objects from an occupancy map in circumstances where an occupancy map indicates the presence of an object while sensors do not detect the object at the same location. Similarly, an objective function that prioritizes collision avoidance may favor maintaining the existence of the object in the occupancy map so as to mitigate the risk of a collision at the expense of potentially maintaining a phantom object in the occupancy map that does not exist in the actual environment in which the UAV is operating. According to certain aspects, an objective function that prioritizes collision avoidance may establish weights, parameters, values, thresholds, etc. such that removing an object from an occupancy map may require corroborating information. Aspects of the present disclosure contemplate other objective functions such as, for example, prioritizing efficiency (e.g., minimize power consumption), prioritizing speed (e.g., selection of the quickest route), prioritizing avoidance of certain weather conditions, prioritizing selection of the most direct route, prioritizing avoidance of areas of dense populations, prioritizing flying at certain altitudes, etc.

Aspects of the present disclosure can also provide employing multiple sensor modalities of a UAV in constructing and/or updating occupancy maps to provide a fuller and more detailed occupancy map. For example, as a UAV is navigating within an environment, a UAV may employ many different sensor modalities, such as an imaging sensor, a laser sensor (e.g., LIDAR), an altimeter, a thermal sensor, RADAR, a barometer, etc. to obtain information regarding objects and structures in the environment in which the UAV is operating. For example, the sensors can provide information such as the size of an object, the relative distance to the object from the UAV, a relative velocity of the object, etc. All the information from the various sensors can be integrated in constructing an occupancy map, which can not only indicate whether an object is present at a given location, but can also facilitate determining other parameters and characteristics relating to occupancy maps, such as, for example, segmentation of the occupancy map, classification of detected objects, establishing relationships between detected objects, etc. Embodiments of the present disclosure can also provide systems and methods to apply a UAV's objective function in obtaining such parameters to determine customized parameters (e.g., segmentation, classification, etc.) in view of the UAV's objective function.

Although embodiments of the present disclosure are described primarily with respect to UAVs, embodiments of the present disclosure can be applicable to other types of vehicles, such as ground vehicles, aerial vehicles, and other unmanned vehicles, etc.

FIG. 1 is a schematic diagram of exemplary environment 100 in which aerial vehicle 140 may operate, in accordance with embodiments of the present disclosure. As illustrated in FIG. 1, environment 100 may include any number of a variety of objects 130. In the illustrated example, objects may include, but are not limited to structures 130-1, such as a house, building, shed, doghouse, etc., plants 130-2, such as trees, shrubs, bushes, etc., vehicle 130-3, such as automobiles, trucks, aerial vehicles, etc., street 130-4, sidewalk 130-5, birds 130-6 and 130-8, street lamp 130-7, person 130-9, etc. As will be appreciated, an environment may include any number, type, size, and/or position of objects. Likewise, objects, as discussed herein, may be stationary, such as structure 130-1, mobile, such as automobile 130-3, birds 130-6 and 130-8, and person 130-9, or stationary but changing (e.g., growing), such as plants 130-2. Any type of object, including fixed, static, mobile, natural, manmade, artificial, temporary, permanent, or other types of objects, obstacles, or structures, may be represented by an object in an occupancy map, in accordance with the embodiments of the present disclosure. Likewise, in some embodiments, objects, as used herein, may not be limited to physical objects. For example, an object may be a restricted airspace, a minimum altitude, a maximum altitude, an area in which navigation is not preferred or prohibited (e.g., over a school, park, power plant, airport, etc.).

Object information, such as the geographic location, position, size, shape, orientation, object type, etc., may often be obtained from publicly accessible information, such as two-dimensional ("2D") parcel maps, three-dimensional ("3D") building maps, cell phone and antenna tower maps, road, bridge, freeway maps, topology maps, terrain maps, etc. Such information may be used alone or in combination with object information obtained from other sources, such as satellite images, images obtained from other vehicles (ground, aerial), etc., to generate occupancy maps that can indicate the presence of objects at various locations to allow UAV 140 to safely operate in environment 100.

Additionally, as UAV 140 operates in environment 100, UAV 140 may employ a variety of different sensors to create dynamic occupancy maps in real time. The dynamically created occupancy maps can supplement already existing occupancy maps of environment 100. For example, as UAV 140 is navigating within environment 100, UAV 140 may employ many different sensor modalities, such as an imaging sensor, a laser sensor (e.g., LIDAR), an altimeter, a thermal sensor, RADAR, etc. to obtain information regarding objects and structures in the environment in which UAV 140 is operating. The sensors can provide information such as the size of an object, the relative distance to the object from UAV 140, a relative velocity of the object relative to UAV 140, etc. Further, once an object has been detected, each sensor modality may be given different weights based on the object type (e.g., person, structure, automobile, plant, animal, etc.), object dynamics (e.g., whether the object is moving or stationary, as well as trajectory, acceleration, velocity, etc. of the object), weather conditions, number of corroborating sensors, etc. For example, in poor visibility conditions, imaging sensors may be provided a lower weight. Similarly, objects that may not effectively reflect laser and radar signals, such as animals and people, may result in LIDAR and RADAR sensors being given a lower weight and thermal and imaging sensors being given a higher weight. All the information from the various sensors can be integrated to determine a confidence score for each object at a given location and can be used to construct and/or update an occupancy map.

Further, the sensor information can facilitate determining additional parameters associated with the occupancy maps. For example, such information can facilitate segmentation of the occupancy map, classification of detected objects, grouping certain objects (e.g., birds 130-8), establishing relationships between objects, etc. According to certain aspects of the present disclosure, objects detected and included in an occupancy map can be segmented broadly, for example, to group and create boundaries around detected objects that may of be concern while ignoring other objects. Other segmentation schemes of detected objects are contemplated by embodiments of the present disclosure (e.g., moving objects, stationary objects, objects in the proximity of takeoff, payload delivery, and landing locations, etc.).

Figure 2A:
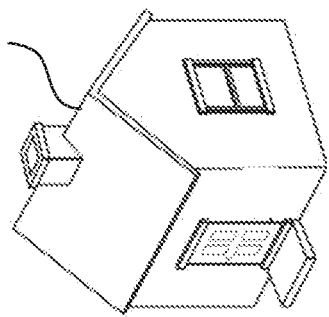
FIG. 2A is a schematic diagram of an exemplary three-dimensional bounding shape for a structure object type, in accordance with embodiments of the present disclosure.
Figure 2A:
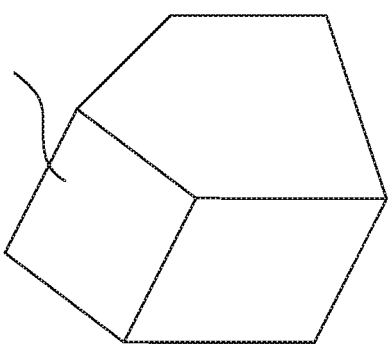

FIGS. 2A-2H are schematic diagrams of three-dimensional bounding shapes of how objects may be represented in an occupancy map. Alternatively, occupancy maps may simply divide the environment into an array of discrete volumetric boxes, and each volumetric box may include an indication whether an object is present in the volumetric box. FIG. 2A shows three-dimensional bounding shape 230-1 for a structure object type 130-1, in accordance with embodiments of the present disclosure. As illustrated, based on data known or available about the structure 130-1, a 3D bounding shape is generated that corresponds to the size, shape, orientation, and position of the structure 130-1. The 3D bounding shape 230-1 may be represented in an occupancy map as a set of vectors representative of the structure.

Figure 2B:
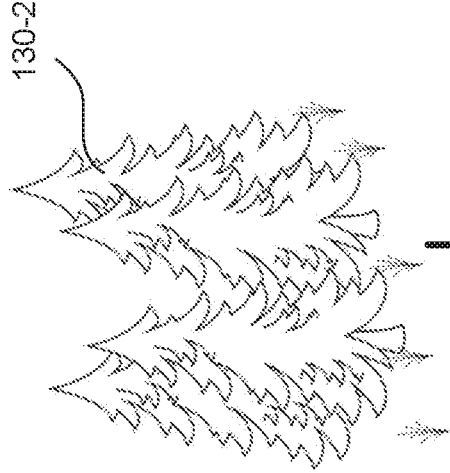
FIG. 2B is a schematic diagram of an exemplary three-dimensional bounding shape for a plant object type, in accordance with embodiments of the present disclosure.
Figure 2B:
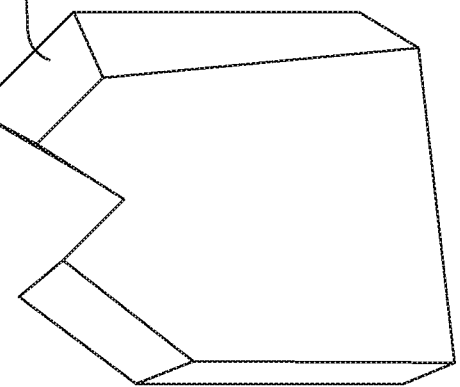

FIG. 2B is a schematic diagram of a three-dimensional bounding shape 230-2 for a plant object type 130-2, in accordance with disclosed implementations. Similar to the structure 3D bounding shape 230-1, plant 3D bounding shape 230-2 is generated that corresponds to the size, shape, orientation, and position of plants 130-2 within the environment. The 3D bounding shape may be represented in an occupancy map as a set of vectors representative of the plant.

Figure 2C:
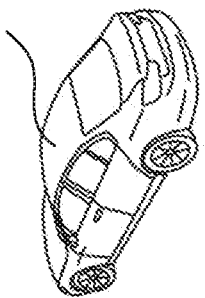
FIG. 2C is a schematic diagram of an exemplary three-dimensional bounding shape for a vehicle object type, in accordance with embodiments of the present disclosure.
Figure 2C:
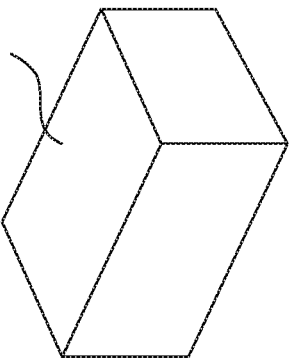

FIG. 2C is a schematic diagram of a three-dimensional bounding shape 230-3 for vehicle object type 130-3, in accordance with disclosed implementations. Similar to the structure 3D bounding shape 230-1, vehicle 3D bounding shape 230-3 is generated that corresponds to the size, shape, orientation, and position of vehicles 130-3 within the environment. The 3D bounding shape may be represented in an occupancy map as a set of vectors representative of the vehicle.

FIG. 2D is a schematic diagram of a three-dimensional bounding shape 230-6 for an animal object type 130-6, in accordance with disclosed implementations. Similar to the structure 3D bounding shape 230-1, animal 3D bounding shape 230-6 is generated that corresponds to the size, shape, orientation, and position of animals 130-6 within the environment. The 3D bounding shape may be represented in an occupancy map as a set of vectors representative of the animal.

FIG. 2E is a schematic diagram of a three-dimensional bounding shape 230-7 for a structure object type 130-7, in accordance with disclosed implementations. Similar to the structure 3D bounding shape 230-1, structure 3D bounding shape 230-7 is generated that corresponds to the size, shape, orientation, and position of structures 130-7 within the environment. The 3D bounding shape may be represented in an occupancy map as a set of vectors representative of the structure.

Figure 2G:
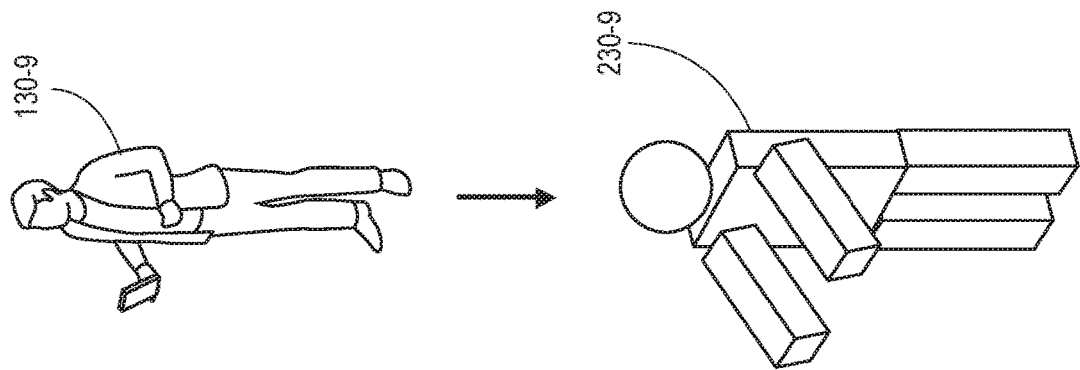
FIG. 2G is a schematic diagram of an exemplary three-dimensional bounding shape for a person object type, in accordance with embodiments of the present disclosure.
Figure 2F:
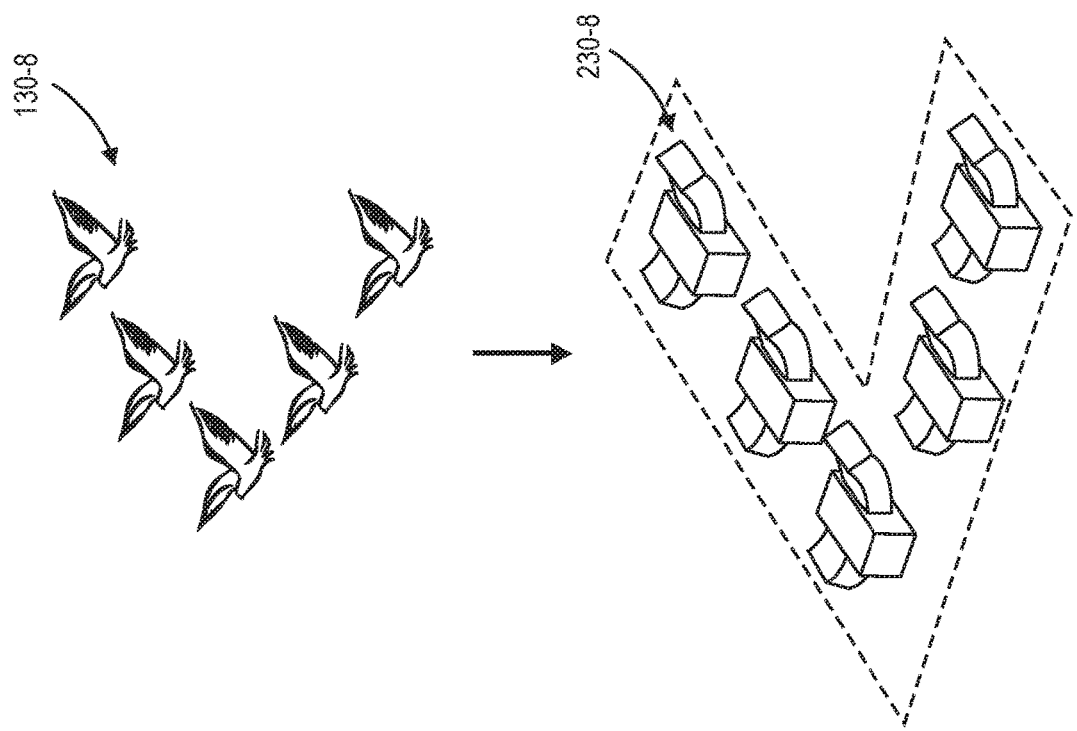
FIG. 2F is a schematic diagram of an exemplary three-dimensional bounding shape for an animal object type, in accordance with embodiments of the present disclosure.

FIG. 2F is a schematic diagram of a three-dimensional bounding shape 230-8 for an animal object type 130-8, in accordance with disclosed implementations. Similar to the structure 3D bounding shape 230-1, animal 3D bounding shape 230-8 is generated that corresponds to the size, shape, orientation, and position of animals 130-8 within the environment. The 3D bounding shape may be represented in an occupancy map as a set of vectors representative of the animal.

FIG. 2G is a schematic diagram of a three-dimensional bounding shape 230-9 for a person object type 130-9, in accordance with disclosed implementations. Similar to the structure 3D bounding shape 230-1, person 3D bounding shape 230-9 is generated that corresponds to the size, shape, orientation, and position of person 130-9 within the environment. The 3D bounding shape may be represented in an occupancy map as a set of vectors representative of the person.

Figure 3:
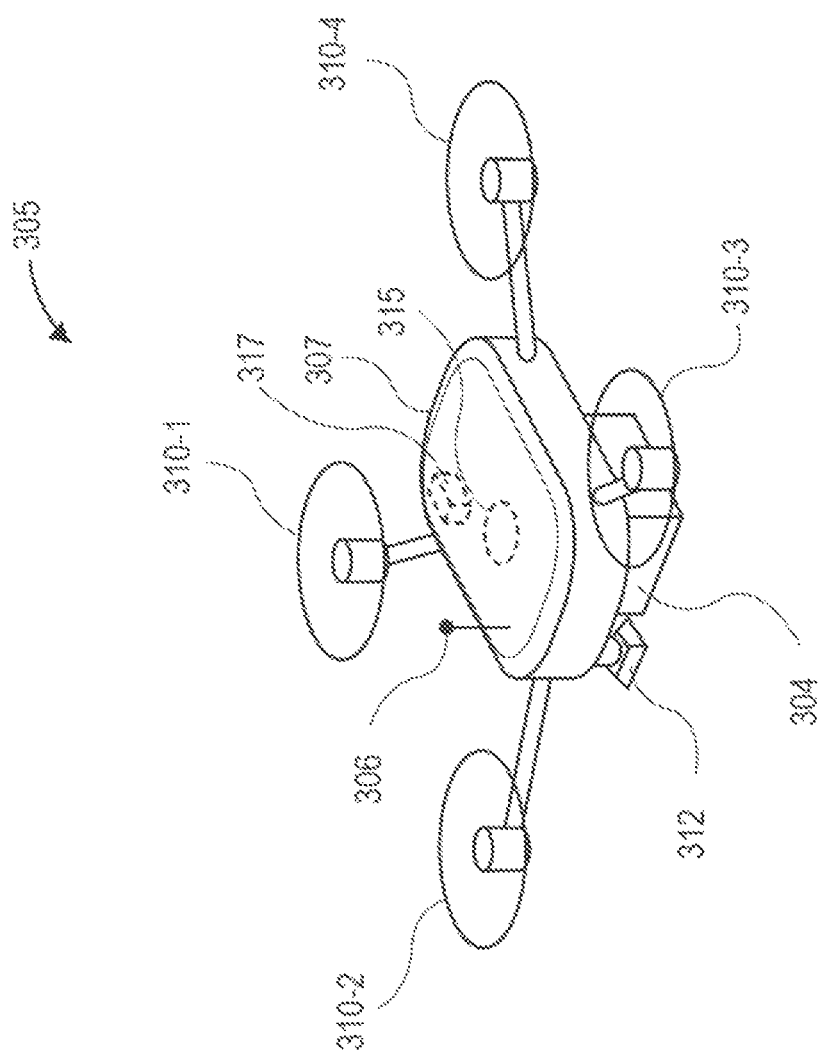
FIG. 3 is an exemplary aerial vehicle, in accordance with embodiments of the present disclosure.

FIG. 3 is an exemplary aerial vehicle 305, in accordance with embodiments of the present disclosure. As shown in FIG. 3, aerial vehicle 305 may include frame or body 307, and plurality of propulsion mechanisms, such as motors and propellers 310, coupled to frame or body 307. Frame or body 307 may be formed of any suitable materials, such as carbon fiber, metals, plastics, or combinations thereof. In addition, motors and propellers 310 may be coupled to frame or body 307, or via one or more motor arms extending from frame or body 307. The motors may be any suitable motors for rotating respective propellers 310 to generate thrust to lift or maneuver at least a portion of aerial vehicle 305. Propellers 310 may be formed of any suitable materials, such as carbon fiber, metals, plastics, or combinations thereof. Further, aerial vehicle 305 may also include control system 315 that may control operation and navigation of aerial vehicle 305, including aspects related to operation of motors and propellers 310.

Although FIG. 3 shows an aerial vehicle having a particular shape, size, number of motors and propellers 310-1, 310-2, 310-3, 310-4, and overall configuration, the systems and methods described herein may be utilized with aerial vehicles having various other shapes, sizes, numbers of motors and propellers, and overall configurations, such as tricopters, quadcopters, hexacopters, octocopters, or various other types of aerial vehicles. In addition, aerial vehicles may include other types of propulsion mechanisms, such as fans, jets, turbojets, turbo fans, jet engines, electric jets, and/or combinations thereof, that may generate noise patterns.

In addition, aerial vehicle 305 may include analysis unit 317 that includes one or more processors that may process or analyze sensor data to detect objects within an environment as aerial vehicle 305 is operating. Analysis unit 317 may be included as part of control system 315 or independent of control system 315.

Aerial vehicle 305 may also include antenna 306 or other wireless transmission mechanism to enable wireless communication between the aerial vehicle and other computing sources, such as computing sources that provide navigation routes, occupancy maps, delivery information, source locations and/or destination locations, etc. Likewise, aerial vehicle 305 includes one or more sensors 312, such as a camera (or other image or optical sensor), ranging sensor (e.g., RADAR, LIDAR, etc.), altimeter, barometer, etc. that may be used by control system 315 and/or analysis unit 317 to navigate aerial vehicle 305 and/or to obtain sensor data representative of detected objects. For example, sensor 312 may be a digital Red, Green, Blue (RGB) camera oriented to obtain images of objects around aerial vehicle 305 when the aerial vehicle is airborne.

Aerial vehicle 305 may also include payload engagement component 304 that is operable to engage, carry, and/or disengage a payload, such as an item, for aerial transport by aerial vehicle 305.

While the examples discussed herein describe implementations with respect to aerial vehicles, it will be appreciated that the exemplary embodiments may also be applied to other forms of vehicles. For example, the disclosed implementations may be used with aerial vehicles, unmanned aerial vehicles, ground based vehicles, unmanned ground based vehicles, water based vehicles, unmanned water based vehicles, amphibious vehicles, and/or unmanned amphibious vehicles. As will be appreciated, different vehicles and/or different types of vehicles may operate with different degrees of freedom.

Figure 4:
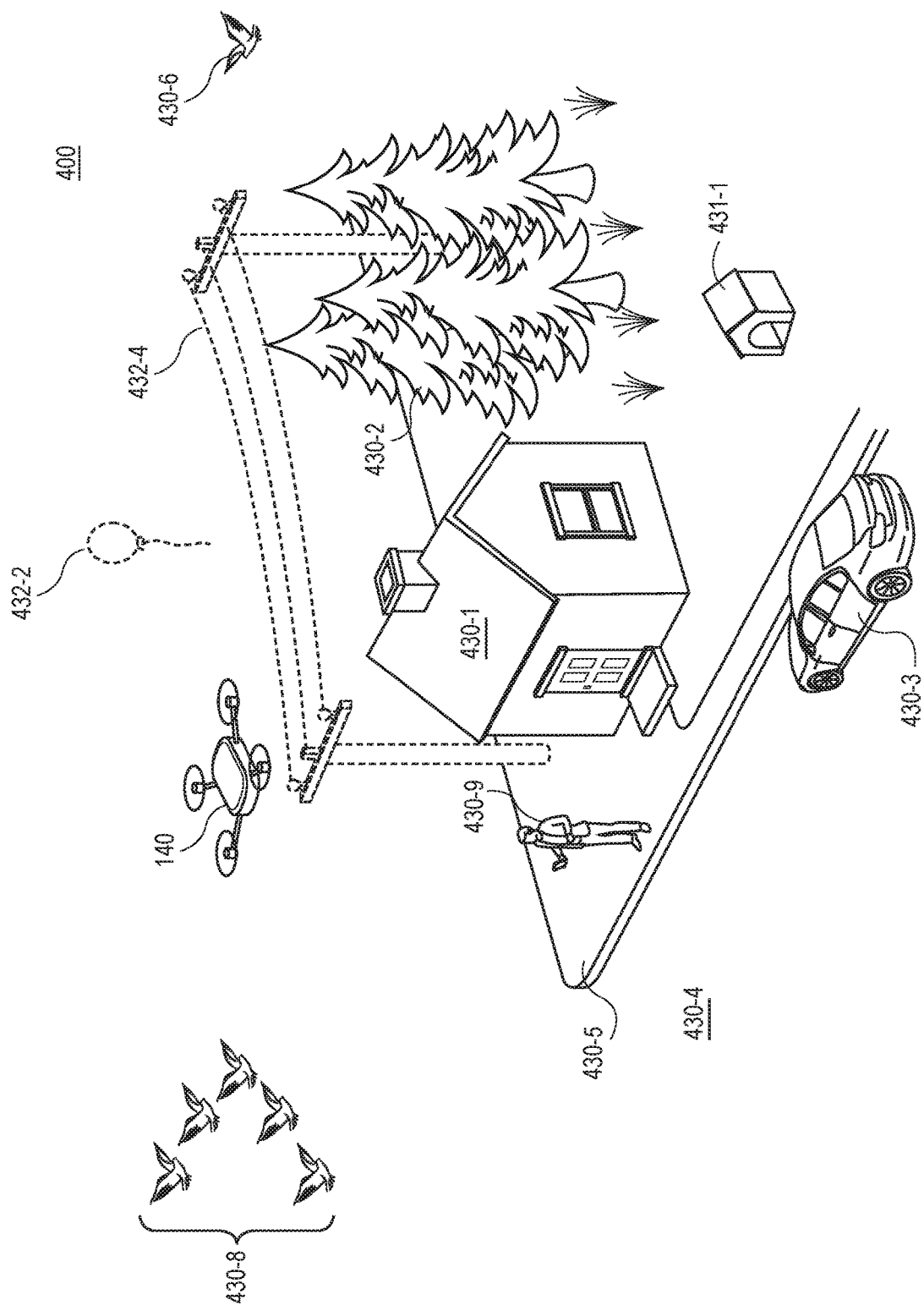
FIG. 4 is a schematic diagram of an exemplary environment in which an aerial vehicle may operate, in accordance with embodiments of the present disclosure.

FIG. 4 is a schematic diagram of example environment 400 in which aerial vehicle 140 may operate, in accordance with embodiments of the present disclosure. Environment 400 may be similar to environment 100 shown in FIG. 1. Similar to environment 100, environment 400 may include any number of a variety of objects 430. In the illustrated example, objects may include, but are not limited to structures 430-1 and 431-1, such as a house, building, shed, doghouse, etc., plants 430-2, such as trees, shrubs, bushes, etc., vehicle 430-3, such as automobiles, trucks, aerial vehicles, etc., street 430-4, sidewalk 430-5, birds 430-6 and 430-8, person 430-9, etc. As will be appreciated, an environment may include any number, type, size, and/or position of objects.

According to one aspect of the present disclosure, environment 400 may be a representation of the same geographic area of that which is shown as environment 100 in FIG. 1 but shown at a different point in time (e.g., at a later point in time). Comparing environment 400 to environment 100 shown in FIG. 1, environment 400 may include additional new objects, such as structure 431-1. Also, other objects may have moved, such as vehicle 430-3, animals 430-6 and 430-8, and person 430-9, and other objects may no longer be present in the environment, such as structure 130-7 and one of plants 130-2.

As shown in FIG. 4, aerial vehicle 140 may be operating in environment 400, which may be at a point later in time than the representation of aerial vehicle 140 operating in environment 100 shown in FIG. 1. Accordingly, aerial vehicle 140 may have an occupancy map of environment 100 which aerial vehicle 140 may utilize to navigate environment 400. The occupancy map of environment 100 may have been constructed/updated while aerial vehicle 140 (or another aerial vehicle) was previously operating in environment 100. Additionally, aerial vehicle 140 may employ a plurality of sensors, as described herein, to detect the presence and/or absence of various objects in the environment as aerial vehicle 140 is navigating environment 400. The sensor information provided by the plurality of sensors and the previously created occupancy map (e.g., of environment 100) can be used to dynamically create and/or update an occupancy map so as to create an updated occupancy map of the environment. Accordingly, in addition to confirming that certain objects remain relative to the occupancy map that may have been created for environment 100, the sensors of aerial vehicle 140 may detect the changes of environment 400 relative to environment 100. For example, the sensors may detect the movement of vehicle 430-3, animals 430-6 and 430-8, and person 430-9, the presence of new structure 431-1, and the absence of structure 130-7 and one of plants 130-2. Further, the sensors of aerial vehicle 140 may detect phantom objects (e.g., objects that may not actually exist in the environment) such as balloon 432-2 and power lines 432-4. Accordingly, the occupancy map can be updated to include these objects and/or changes in the environment in an updated occupancy map.

According to certain embodiments of the present disclosure, the utility function under which aerial vehicle 140 is operating can be utilized in determining whether these objects and changes should be included in the new created/updated occupancy map. For example, aerial vehicle 140 may be operating under an objective function that prioritizes collision avoidance. Accordingly, although structure 130-7 and one of plants 130-2, which were present in environment 100, are no longer detected by the sensors in environment 400, the objective function of aerial vehicle 140 may determine that those structures should remain in the occupancy map. As discussed herein, the objective function may require that for an object to be removed from an occupancy map, a confidence score associated with the absence of that object should exceed a certain threshold. Alternatively, a confidence score can be determined for the presence of the object at that location and an absence of the object at that location, and a comparison of the two confidence scores can be performed to determine whether the object should be removed from the occupancy map. Additionally, although balloon 432-2 and power lines 432-4 are phantom objects that may not actually exist in environment 400, the objective function of aerial vehicle 140 may determine that those structures should be included in the occupancy map.

Figure 5:
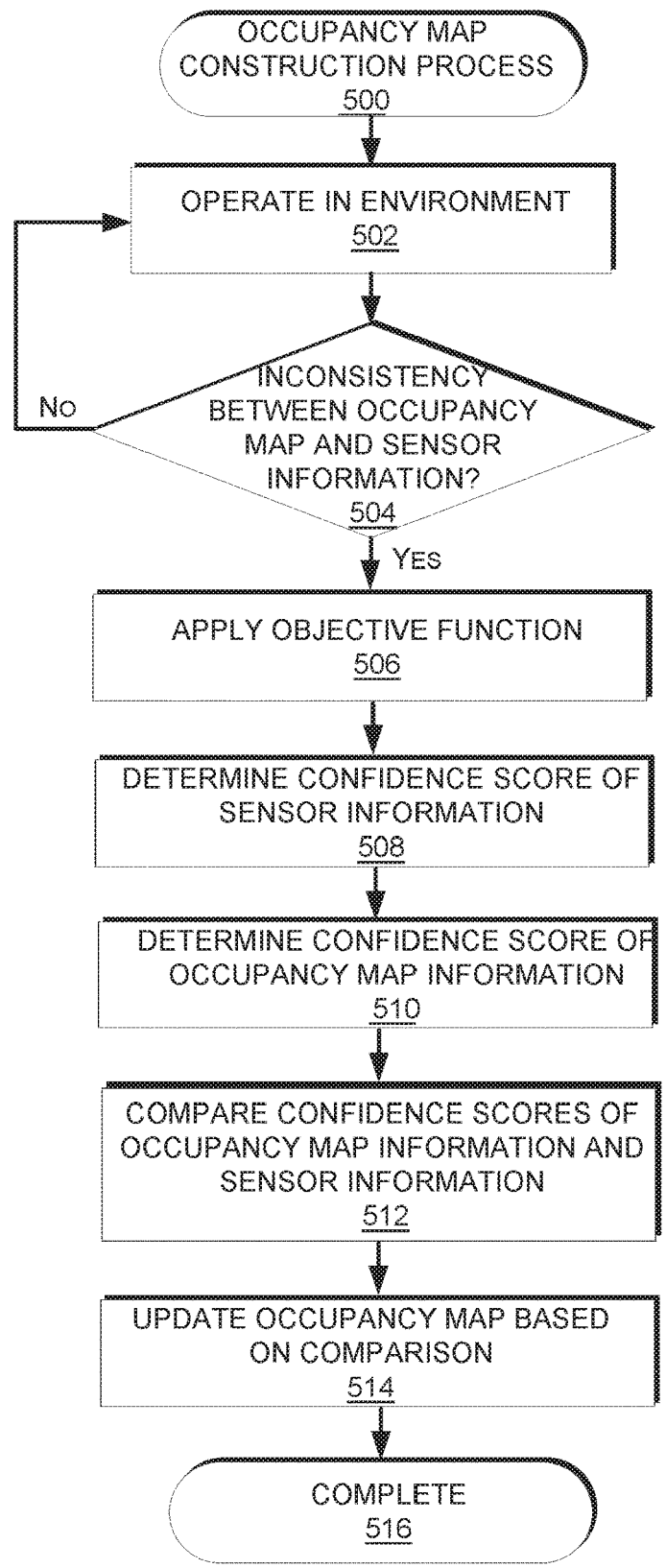
FIG. 5 is a flow diagram of an exemplary occupancy map construction process, in accordance with described implementations.

FIG. 5 shows a flow diagram of an exemplary process 500 for constructing an occupancy map according to embodiments of the present disclosure. Process 500 may be performed as an aerial vehicle is operating in an environment and encounters an inconsistency between information obtained from an existing occupancy map and detection information obtained from any of its sensors. As shown in FIG. 5, in step 502 an aerial vehicle (e.g., aerial vehicle 140 or 305) can be operating in an environment (e.g., environment 100 or 400). In step 504, it can be determined if there is an inconsistency between information obtained from an existing occupancy map and detection information obtained from any of its sensors. For example, this can include situations where the existing occupancy map indicates an existence of an object while it goes undetected by any of the aerial vehicle's sensors and situations where the aerial vehicle's sensors detect an object that is not included in an existing occupancy map. If no inconsistency between sensor information and object information in the occupancy map is encountered, the aerial vehicle can continue to operate in the environment. In the event that an inconsistency is identified, the objective function under which the aerial vehicle is operating can be applied (step 506) to determine whether the object should be included or removed in the occupancy map. For example, in step 508, a confidence score for the presence or absence of an undetected object can be determined with respect to the information received from the sensor(s) of the aerial vehicle. This can include, for example, the object type of the object that was the focus of the inconsistent information (e.g., can provide an indication of how fleeting the object may be at a given location—whether the object is expected to remain at a given location at a later point in time given the object type, altitude, location, etc.), object dynamics (e.g., whether the object is moving or stationary, as well as trajectory, acceleration, velocity, etc. of the object), the sensor type of the sensors that may have yielded the inconsistent information, the relevance of the sensor types to the object type (e.g., reliability of detecting that object type with that sensor type), the number of sensors that may have yielded the inconsistent information, the conditions under which the inconsistent information was encountered (e.g., weather, traffic, etc.), the date on which the existing occupancy map was created, etc. In step 510 a confidence score can be determined for the occupancy map information that resulted in the inconsistent information. For example, determination of the confidence score associated with the occupancy map can include the age of the occupancy map, corroboration of the information included in the existing occupancy map, etc. According to aspects of the present disclosure, the confidence scores for the sensor information and the occupancy map can be determined by the objective function, by establishing the weights and parameters that are to be applied in determining the respective confidence scores. In step 512, the confidence scores for the sensor information and the occupancy map can be compared. Based on the comparison of the confidence scores, the occupancy map can be updated to include, add, or remove the object in step 514.

Figure 6:
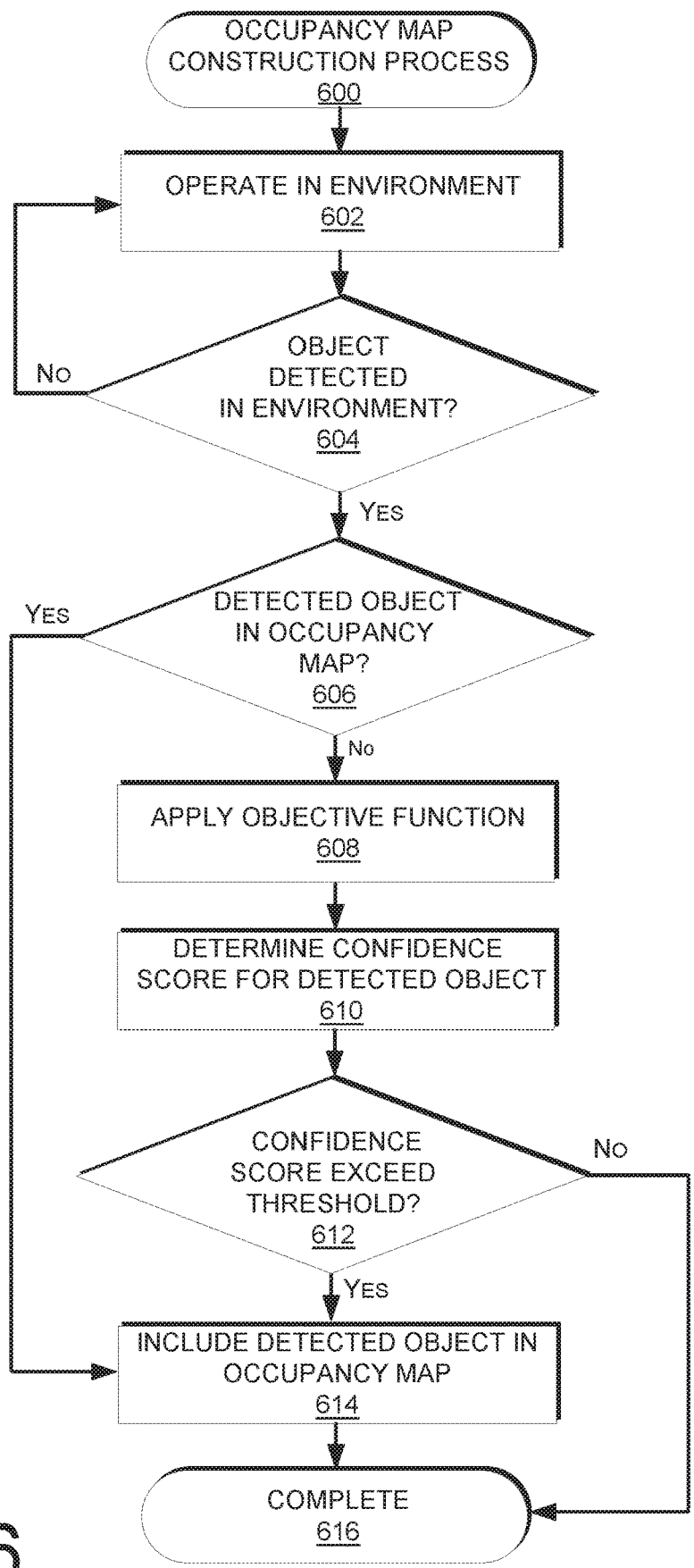
FIG. 6 is a flow diagram of an example occupancy map construction process, in accordance with embodiments of the present disclosure.

FIG. 6 shows a flow diagram of an exemplary process 600 for constructing an occupancy map according to embodiments of the present disclosure. Process 600 may be performed as an aerial vehicle is operating in an environment and one or more of its sensors detects an object in the environment in which it is operating. As shown in FIG. 6, in step 602 an aerial vehicle (e.g., aerial vehicle 140 or 305) can be operating in an environment (e.g., environment 100 or 400). In step 604, it can be determined if an object is detected (e.g., by any of the sensors of the aerial vehicle) in the environment in which it is operating. If no object is detected, the aerial vehicle can continue operating in the environment. In the event that an object is detected in the environment, it can be determined if the detected object is present in an existing occupancy map (step 606). If the object is present in an existing occupancy map, the object can remain in the occupancy map (step 614) and the process can complete in step 616.

Alternatively, in the event that the detected object is not present in the occupancy map, the objective function under which the aerial vehicle is operating can be applied (step 608) to determine whether the detected object should be included in the occupancy map. For example, in step 610, a confidence score for the presence of the detected object can be determined. This can include, for example, the object type of the object that was detected (e.g., can provide an indication of how fleeting the object may be at a given location—whether the object is expected to remain at a given location at a later point in time given the object type, altitude, location, etc.), object dynamics (e.g., whether the object is moving or stationary, as well as trajectory, acceleration, velocity, etc. of the object), the sensor type of the sensor that detected the object, the relevance of the sensor type to the object type (e.g., reliability of detecting that object type with that sensor type), the number of sensors that detected the object, the conditions under which the object was detected (e.g., weather, traffic, etc.), whether the object was included in an existing occupancy map, the date on which the occupancy map was created, etc. For example, if a thermal sensor detects a heat signature matching that of a dog, additional sensors, such as an image sensor, corroborates the detection of a dog in clear weather conditions, and the existing occupancy map that does not include the dog is over a year old, a high confidence score may be associated with the detection of the dog and may be added to the occupancy map. In another example, an image sensor alone may detect a cellular network tower in weather conditions with poor visibility and the existing occupancy map that does not include the detected cellular network tower may be a day old. However, although the confidence score associated with the detected cellular network may be low, it may be scaled (e.g., by the objective function) to a high confidence score because a collision with a cellular network tower may be considered a high-risk collision.

Once the confidence score has been determined, the confidence score can be compared to a threshold value in step 612. This threshold value can be determined by the objective function dictating operation of the aerial vehicle. For example, for an objective function that prioritizes collision avoidance, the threshold can be set at a low value. If it is determined that the detected object should be included in the occupancy map, the object can be added to the occupancy map (step 614) and the process can complete in step 616.

Figure 7:
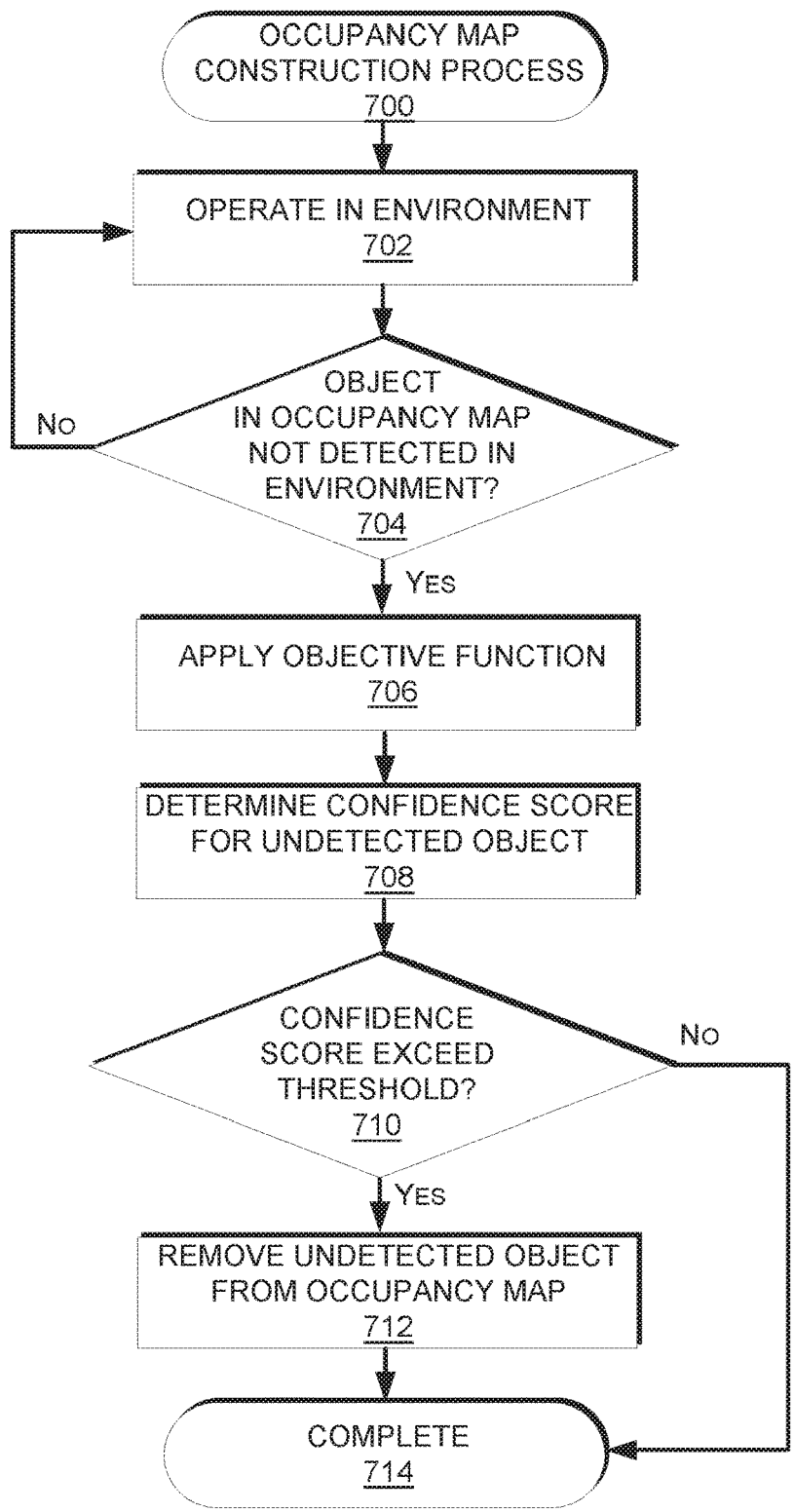
FIG. 7 is a flow diagram of an example occupancy map construction process, in accordance with embodiments of the present disclosure.

FIG. 7 shows a flow diagram of an exemplary process 700 for constructing an occupancy map according to embodiments of the present disclosure. Process 700 may be performed as an aerial vehicle is operating in an environment and identifies an object in an existing occupancy map that is undetected by any of its sensors. As shown in FIG. 7, in step 702 an aerial vehicle (e.g., aerial vehicle 140 or 305) can be operating in an environment (e.g., environment 100 or 400). In step 704, it can be determined if an object that exists in an occupancy map is undetected (e.g., by any of the sensors of the aerial vehicle). If no inconsistency between sensor information and object information in the occupancy map is encountered, the aerial vehicle can continue to operate in the environment. In the event that an object is identified in an existing occupancy map but goes undetected by any of the sensors of the aerial vehicle, the objective function under which the aerial vehicle is operating can be applied (step 706) to determine whether the object should be included or removed in the occupancy map. For example, in step 708, a confidence score for the presence of the undetected object can be determined. This can include, for example, the object type of the object that was undetected yet included in the existing occupancy map (e.g., can provide an indication of how fleeting the object may be at a given location—whether the object is expected to remain at a given location at a later point in time given the object type, altitude, location, etc.), the sensor type of the sensors that the aerial vehicle may employ and resulted in the undetected object, the relevance of the sensor types to the object type (e.g., reliability of detecting that object type with that sensor type), the number of sensors employed by the aerial vehicle, the conditions under which the object was detected (e.g., weather, traffic, etc.), the date on which the existing occupancy map was created, etc. For example, if a building, which exists in an existing occupancy map created 1 day ago, goes undetected by a single aerial vehicle with a single sensor in poor weather conditions, a low confidence score may be associated with the absence of the building. In another example, if a crane, which exists in an existing occupancy map created 1 year ago, goes undetected by multiple aerial vehicles with multiple sensors over the course of a week in good weather conditions, a high confidence score may be associated with the absence of the crane. Similar to process 600, the confidence score associated with any undetected object that is present in an existing occupancy map can be scaled (e.g., by the objective function) based on a risk assessment of a potential collision with the undetected object.

Once the confidence score has been determined, the confidence score can be compared to a threshold value in step 710. This threshold value can be determined by the objective function dictating operation of the aerial vehicle. For example, for an objective function that prioritizes collision avoidance, the threshold can be set at a high value. If it is determined that the undetected object should be removed in the occupancy map, the object can be removed from the occupancy map (step 712) and the process can complete in step 714.

Figure 8:
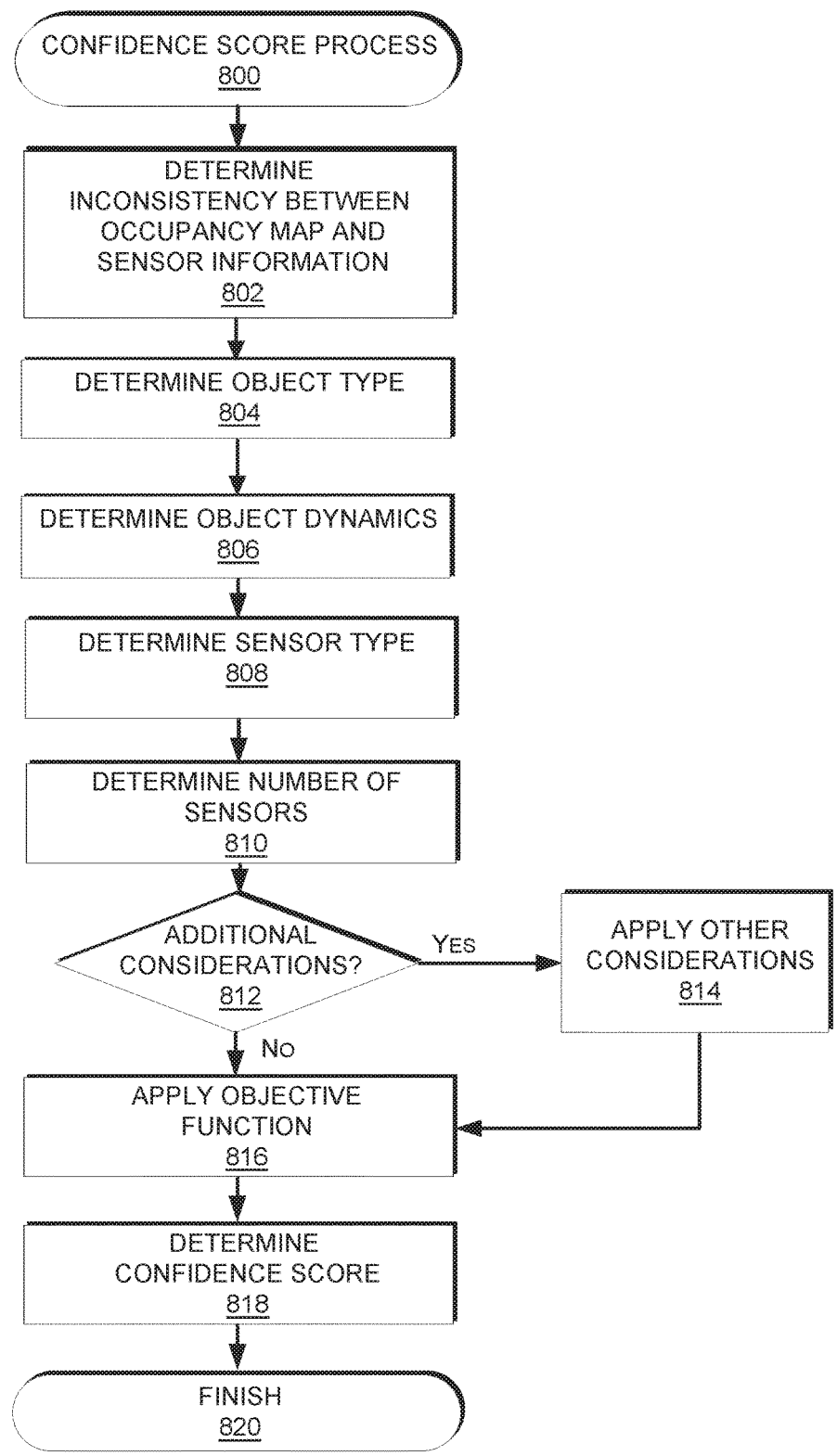
FIG. 8 is a flow diagram of an example confidence score process, in accordance with embodiments of the present disclosure.

FIG. 8 shows a flow diagram of an exemplary process 800 for determining a confidence score according to embodiments of the present disclosure. Process 800 may be performed in constructing and/or updating an occupancy map as an aerial vehicle is operating in an environment. As shown in FIG. 8, in step 802 an aerial vehicle (e.g., aerial vehicle 140 or 305) can be operating in an environment (e.g., environment 100 or 400) and determines an inconsistency between occupancy map information and sensor information. In step 804 the object type of the object that is the cause of the inconsistent information can be determined, and in step 806, the object dynamics of the object that is the cause of the inconsistent information can be determined. In step 808, the sensor type of the sensor(s) that may have yielded the inconsistent information can be determined and in step 810, the number of sensors that may have yielded the inconsistent information can be determined. It can also be determined whether other considerations, such as the weather, traffic, etc. should also be included (step 812), and if any such additional considerations should be included, they can be applied, as in step 814. In step 816, an objective function can be applied to provide relative weighting and values for all the inputs that were determined in steps 804-814. For example, the objective function can determine weights and relative value based on the age of the occupancy map, the object type of the object in question (e.g., can provide an indication of how fleeting the object may be at a given location—whether the object is expected to remain at a given location at a later point in time given the object type, altitude, location, etc.), object dynamics (e.g., whether the object is moving or stationary, as well as trajectory, acceleration, velocity, etc. of the object), corroboration of the information included in the existing occupancy map, the relevance of the sensor types to the object type (e.g., reliability of detecting that object type with that sensor type), assessment of risk of potential collision, etc. Based on the inputs and the relative values, weightings, etc. applied by the objective function, the confidence score can be determined in step 818.

According to certain embodiments of the present disclosure, comparisons of the confidence scores and/or the threshold values may not yield a definitive determination whether an object should be added, included, and/or removed from an occupancy map. In such situations, aspects of the present disclosure can include sending a flight instruction to the aerial vehicle so that it may obtain additional information about the object such that a determination can be made. For example, the aerial vehicle can be commanded to maintain position and utilize additional sensors to obtain additional sensor information in connection with the object and/or await additional information that may be provided by other aerial vehicles operating in the environment. Alternatively and/or in addition, the aerial vehicle can be commanded to maneuver to another location to obtain a different perspective of the object and obtain additional sensor information in connection with the object. Once any additional information has been obtained and/or received regarding the object, any of processes 500, 600, 700, and/or 800 can be performed to determine whether the object should be added, included, and/or removed from the occupancy map.

According to certain embodiments of the present disclosure, the objective function can be utilized to determine other parameters and/or characteristics of constructed occupancy maps. For example, an aerial vehicle's objective function can be used to determine the manner in which a segmentation of an occupancy map is to be performed.

Figure 9:
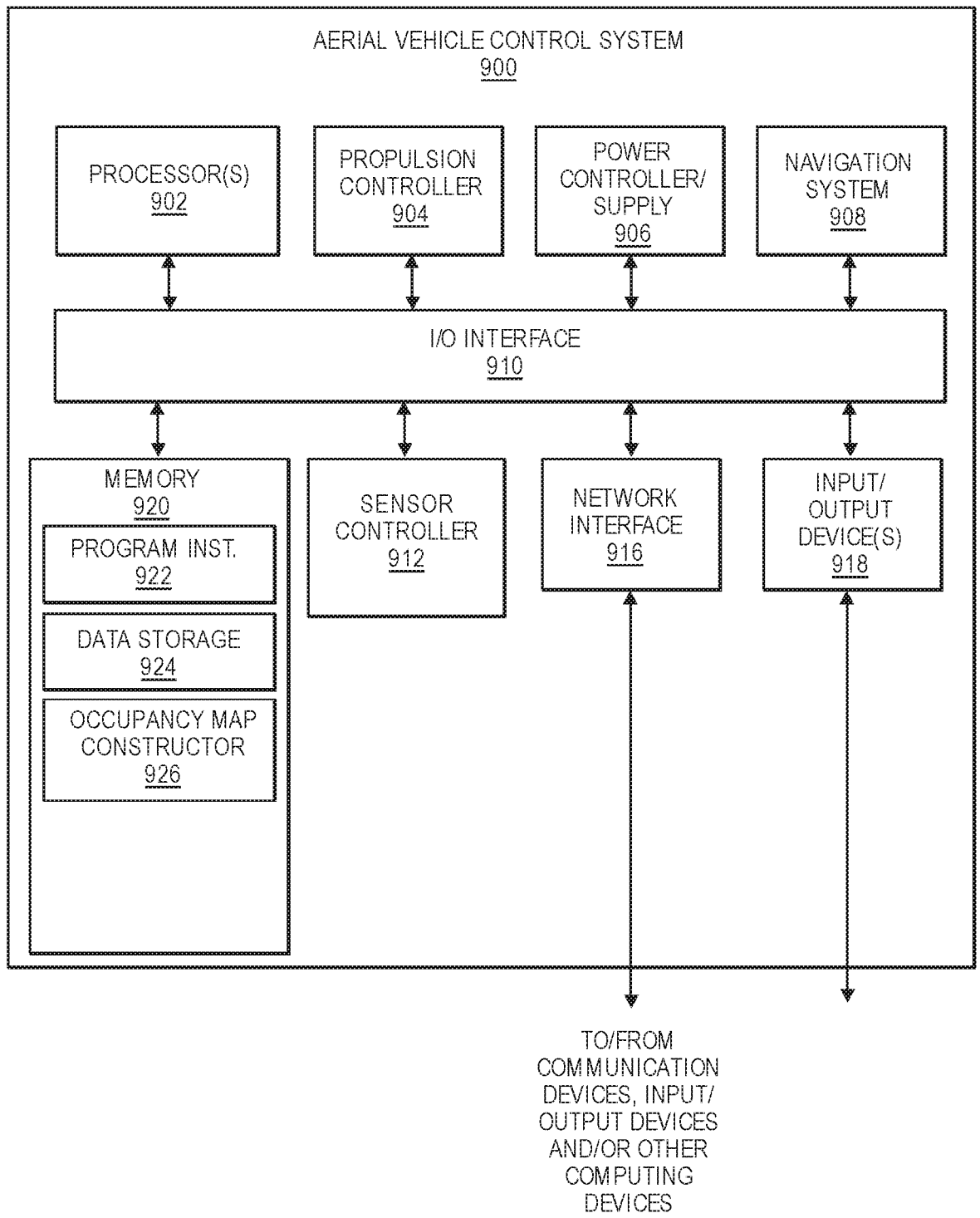
FIG. 9 is an exemplary aerial vehicle control system, in accordance with embodiments of the present disclosure.

FIG. 9 is a block diagram illustrating various components of an exemplary aerial vehicle control system 900, in accordance with embodiments of the present disclosure.

In various examples, the block diagram may be illustrative of one or more aspects of aerial vehicle control system 900 that may be used to implement the various systems and methods discussed herein and/or to control operation of an aerial vehicle discussed herein. In the illustrated implementation, aerial vehicle control system 900 includes one or more processors 902, coupled to a memory, e.g., a non-transitory computer readable storage medium 920, via input/output (I/O) interface 910. Aerial vehicle control system 900 also includes propulsion mechanism controllers 904, such as electronic speed controls (ESCs) or motor controllers, power modules 906 and/or navigation system 908. Aerial vehicle control system 900 further includes sensor controller 912, network interface 916, and one or more input/output devices 918.

In various implementations, aerial vehicle control system 900 may be a uniprocessor system including one processor 902, or a multiprocessor system including several processors 902 (e.g., two, four, eight, or another suitable number). Processor(s) 902 may be any suitable processor capable of executing instructions. For example, in various implementations, processor(s) 902 may be general-purpose or embedded processors implementing any of a variety of instruction set architectures (ISAs), such as the x86, PowerPC, SPARC, or MIPS ISAs, or any other suitable ISA. In multiprocessor systems, each processor 902 may commonly, but not necessarily, implement the same ISA.

Non-transitory computer readable storage medium 920 may be configured to store executable instructions, data, navigation routes, flight control parameters, sensor information, occupancy maps, and/or data items accessible by processor(s) 902. In various implementations, non-transitory computer readable storage medium 920 may be implemented using any suitable memory technology, such as static random access memory (SRAM), synchronous dynamic RAM (SDRAM), nonvolatile/flash-type memory, or any other type of memory. In the exemplary embodiments, program instructions and data implementing desired functions, such as those described herein, are shown stored within non-transitory computer readable storage medium 920 as program instructions 922, data storage 924 and occupancy map constructor 926, respectively. In other implementations, program instructions, data, sensor information, occupancy maps, and/or flight controls may be received, sent, or stored upon different types of computer-accessible media, such as non-transitory media, or on similar media separate from non-transitory computer readable storage medium 920 or aerial vehicle control system 900. Generally, a non-transitory, computer readable storage medium may include storage media or memory media such as magnetic or optical media, e.g., disk or CD/DVD-ROM, coupled to aerial vehicle control system 900 via I/O interface 910. Program instructions and data stored via a non-transitory computer readable medium may be transmitted by transmission media or signals such as electrical, electromagnetic, or digital signals, which may be conveyed via a communication medium such as a network and/or a wireless link, such as may be implemented via network interface 916.

According to certain embodiments of the present disclosure, I/O interface 910 may be configured to coordinate I/O traffic between processor(s) 902, non-transitory computer readable storage medium 920, and any peripheral devices, the network interface or other peripheral interfaces, such as input/output devices 918. In some embodiments, I/O interface 910 may perform any necessary protocol, timing or other data transformations to convert data signals from one component (e.g., non-transitory computer readable storage medium 920) into a format suitable for use by another component (e.g., processor(s) 902). In some embodiments, I/O interface 910 may include support for devices attached through various types of peripheral buses, such as a variant of the Peripheral Component Interconnect (PCI) bus standard or the Universal Serial Bus (USB) standard, for example. In some embodiments, the function of I/O interface 910 may be split into two or more separate components, such as a north bridge and a south bridge, for example. Also, in some implementations, some or all of the functionality of I/O interface 910, such as an interface to non-transitory computer readable storage medium 920, may be incorporated directly into processor(s) 902.

Propulsion mechanism controllers 904 may communicate with navigation system 908 and adjust the rotational speed, position, orientation, or other parameters of each propulsion mechanism, to stabilize the aerial vehicle, and/or to perform one or more maneuvers and guide the aerial vehicle along a navigation route and/or to a safe landing location.

Navigation system 908 may include a global positioning system (GPS), indoor positioning system (IPS), or other similar system and/or sensors that can be used to navigate the aerial vehicle to and/or from a location. Sensor controller 912 can communicate with the sensors and receive sensor information (e.g., detection information in connection with an object, etc.).

Network interface 916 may be configured to allow data to be exchanged between aerial vehicle control system 900, other devices attached to a network, such as other computer systems (e.g., remote computing resources), and/or with aerial vehicle control systems of other aerial vehicles. For example, network interface 916 may enable wireless communication between the aerial vehicle and an aerial vehicle control system that is implemented on one or more remote computing resources. For wireless communication, an antenna of the aerial vehicle or other communication components may be utilized. As another example, network interface 916 may enable wireless communication between numerous aerial vehicles. In various implementations, network interface 916 may support communication via wireless general data networks, such as a Wi-Fi network. For example, network interface 916 may support communication via telecommunications networks, such as cellular communication networks, satellite networks, and the like.

Input/output devices 918 may, in some exemplary embodiments, include one or more displays, imaging devices, thermal sensors, infrared sensors, time of flight sensors, accelerometers, pressure sensors, weather sensors, etc. Multiple input/output devices 918 may be present and controlled by the aerial vehicle control system 900. One or more of these sensors may be utilized to implement the implementations described.

As shown in FIG. 9, the memory may include program instructions 922, which may be configured to implement the exemplary routines and/or sub-routines described herein. Data storage 924 may include various data stores for maintaining data items that may be provided for aerial vehicle navigation, determining navigation routes, landing, detecting objects, detecting object types, determining object dynamics, generating semantic layers, generating semantic c-spaces, generating combined c-spaces, etc. In various implementations, the parameter values and other data illustrated herein as being included in one or more data stores may be combined with other information not described or may be partitioned differently into more, fewer, or different data structures. In some implementations, data stores may be physically located in one memory or may be distributed among two or more memories.

Those skilled in the art will appreciate that aerial vehicle control system 900 is merely illustrative and is not intended to limit the scope of the present disclosure. In particular, the computing system and devices may include any combination of hardware or software that can perform the indicated functions. Aerial vehicle control system 900 may also be connected to other devices that are not illustrated, or instead may operate as a stand-alone system. In addition, the functionality provided by the illustrated components may, in some implementations, be combined in fewer components or distributed in additional components. Similarly, in some implementations, the functionality of some of the illustrated components may not be provided and/or other additional functionality may be available.

Those skilled in the art will also appreciate that, while various items are illustrated as being stored in memory or storage while being used, these items or portions of them may be transferred between memory and other storage devices for purposes of memory management and data integrity. Alternatively, in other implementations, some or all of the software components may execute in memory on another device and communicate with aerial vehicle control system 900. Some or all of the system components or data structures may also be stored (e.g., as instructions or structured data) on a non-transitory, computer-accessible medium or a portable article to be read by an appropriate drive, various examples of which are described herein. In some implementations, instructions stored on a computer-accessible medium separate from aerial vehicle control system 900 may be transmitted to aerial vehicle control system 900 via transmission media or signals such as electrical, electromagnetic, or digital signals, conveyed via a communication medium such as a wireless link. Various implementations may further include receiving, sending, or storing instructions and/or data implemented in accordance with the foregoing description upon a computer-accessible medium. Accordingly, the techniques described herein may be practiced with other aerial vehicle control system configurations.

Figure 10:
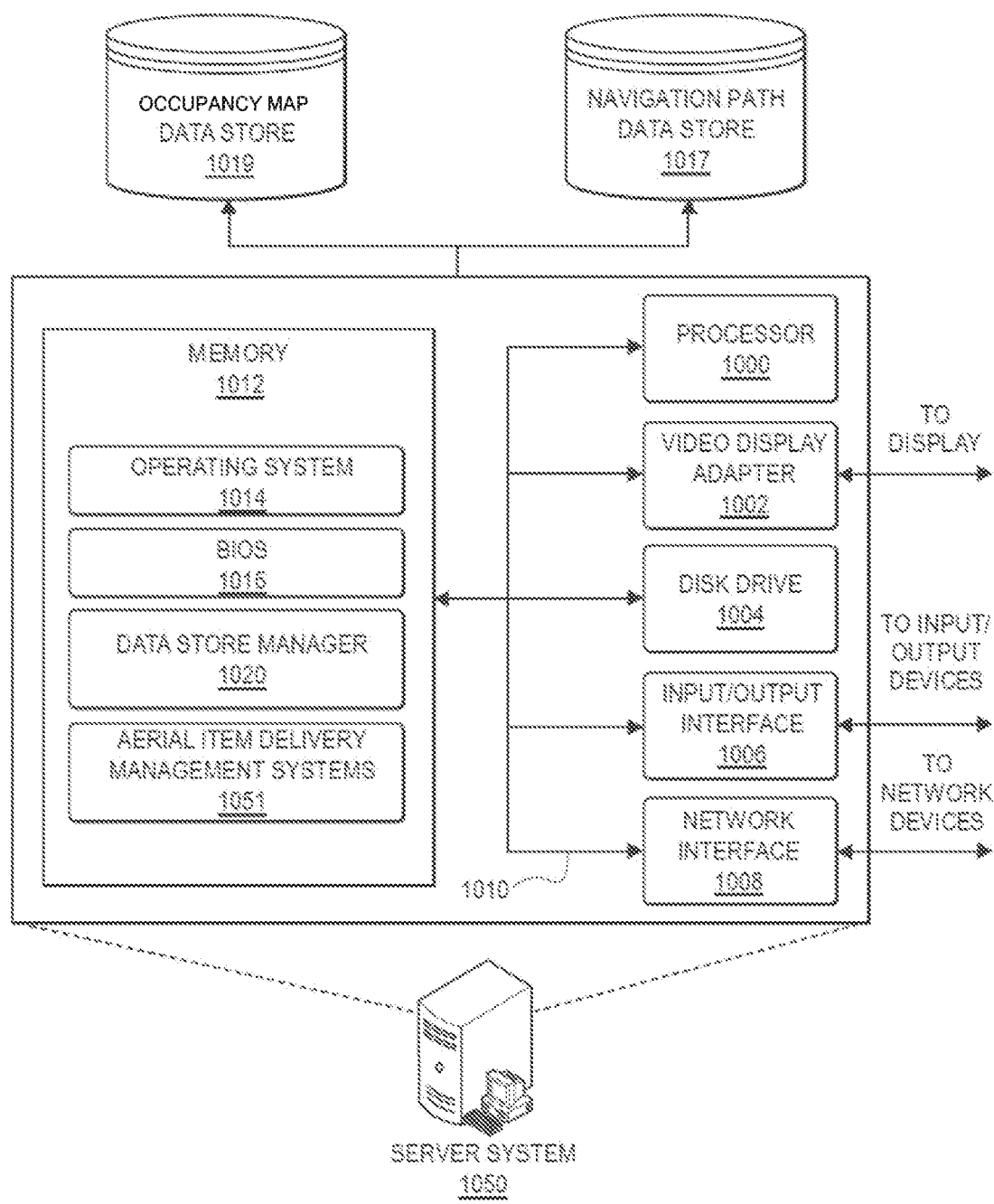
FIG. 10 is an exemplary computing system, in accordance with embodiments of the present disclosure.

FIG. 10 is a pictorial diagram of an illustrative implementation of server system 1050 that may be used in accordance with exemplary embodiments of the present disclosure.

Server system 1050 may include processor 1000, such as one or more redundant processors, video display adapter 1002, disk drive 1004, input/output interface 1006, network interface 1008, and memory 1012. Processor 1000, video display adapter 1002, disk drive 1004, input/output interface 1006, network interface 1008, and memory 1012 may be communicatively coupled to each other by communication bus 1010.

Video display adapter 1002 provides display signals to a local display permitting an operator of server system 1050 to monitor and configure operation of server system 1050. Input/output interface 1006 likewise communicates with external input/output devices, such as a mouse, keyboard, scanner, or other input and output devices that can be operated by an operator of server system 1050. Network interface 1008 includes hardware, software, or any combination thereof, to communicate with other computing devices. For example, network interface 1008 may be configured to provide communications between server system 1050 and other computing devices, such as aerial vehicle control system 900 (FIG. 9) of an aerial vehicle (e.g., such as aerial vehicle 305 shown in FIG. 3).

Memory 1012 may be a non-transitory computer readable storage medium configured to store executable instructions accessible by processor(s) 1000. In various implementations, the non-transitory computer readable storage medium may be implemented using any suitable memory technology, such as static random access memory (SRAM), synchronous dynamic RAM (SDRAM), nonvolatile/flash-type memory, or any other type of volatile or permanent memory. In the illustrated implementation, program instructions and data implementing desired functions, such as those described herein, are shown stored within the non-transitory computer readable storage medium. In other embodiments, program instructions may be received, sent, or stored upon different types of computer-accessible media, such as non-transitory media, or on similar media separate from the non-transitory computer readable storage medium. Generally, a non-transitory, computer readable storage medium may include storage media or memory media such as magnetic or optical media, e.g., disk or CD/DVD-ROM. Program instructions and data stored via a non-transitory computer readable medium may be transmitted by transmission media or signals such as electrical, electromagnetic, or digital signals, which may be conveyed via a communication medium such as a network and/or a wireless link, such as may be implemented via network interface 1008.

Memory 1012 is shown storing operating system 1014 for controlling the operation of server system 1050. Binary input/output system (BIOS) 1016 for controlling the low-level operation of server system 1050 is also stored in memory 1012. Memory 1012 additionally stores computer executable instructions, that, when executed by processor 1000 cause the processor to perform one or more of the processes discussed herein. Memory 1012 additionally stores program code and data for providing network services. Data store manager application 1020 facilitates data exchange between data stores 1017, 1019 and/or other data stores.

As used herein, the term "data store" refers to any device or combination of devices capable of storing, accessing and retrieving data which may include any combination and number of data servers, databases, data storage devices and data storage media in any standard, distributed or clustered environment. Server system 1050 can include any appropriate hardware and software for integrating with data stores 1017, 1019 as needed to execute aspects of management systems 1050.

Data stores 1017, 1019 can include several separate data tables, databases or other data storage mechanisms and media for storing data relating to a particular aspect. For example, data stores 1017, 1019 as illustrated include mechanisms for maintaining navigation route information, occupancy maps, etc. Depending on the configuration and use of server system 1050, one or more of the data stores may not be included or accessible to server system 1050 and/or other data stores may be included or accessible.

It should be understood that there can be many other aspects that may be stored in data stores 1017, 1019. Data stores 1017, 1019 are operable, through logic associated therewith, to receive instructions from server system 1050 and obtain, update or otherwise process data in response thereto.

Memory 1012 may also include aerial item delivery management systems 1051. Item delivery management system 1051 may be configured to perform some or all of the implementations discussed herein and/or to exchange data and information with one or more aerial vehicles. For example, item delivery management system 1051 may perform one or more of the processes discussed above with respect to FIGS. 5 through 8.

The corresponding server system 1050 may be executable by processor 1000 to implement one or more of the functions of server system 1050. According to one exemplary embodiment, server system 1050 may represent instructions embodied in one or more software programs stored in memory 1012. In another embodiment, server system 1050 can represent hardware, software instructions, or a combination thereof.

Server system 1050, in one implementation, is a distributed environment utilizing several computer systems and components that are interconnected via communication links, using one or more computer networks or direct connections. It will be appreciated by those of ordinary skill in the art that such a system could operate equally well in a system having fewer or a greater number of components than are illustrated in FIG. 10. Thus, the depiction in FIG. 10 should be taken as being illustrative in nature and not limiting to the scope of the disclosure.

It should be understood that, unless otherwise explicitly or implicitly indicated herein, any of the features, characteristics, alternatives or modifications described regarding a particular implementation herein may also be applied, used, or incorporated with any other implementation described herein, and that the drawings and detailed description of the present disclosure are intended to cover all modifications, equivalents and alternatives to the various implementations as defined by the appended claims.

Moreover, with respect to the one or more methods or processes of the present disclosure shown or described herein, including but not limited to the flow charts shown in FIGS. 5 through 8, order in which such methods or processes are presented are not intended to be construed as any limitation on the claimed inventions, and any number of the method or process steps or boxes described herein can be combined in any order and/or in parallel to implement the methods or processes described herein. Also, the drawings herein are not drawn to scale.

Conditional language, such as, among others, "can," "could," "might," or "may," unless specifically stated otherwise, or otherwise understood within the context as used, is generally intended to convey in a permissive manner that certain implementations could include, or have the potential to include, but do not mandate or require, certain features, elements and/or steps. In a similar manner, terms such as "include," "including" and "includes" are generally intended to mean "including, but not limited to." Thus, such conditional language is not generally intended to imply that features, elements and/or steps are in any way required for one or more implementations or that one or more implementations necessarily include logic for deciding, with or without input or prompting, whether these features, elements and/or steps are included or are to be performed in any particular implementation.

The elements of a method, process, or algorithm described in connection with the implementations disclosed herein can be embodied directly in hardware, in a software module stored in one or more memory devices and executed by one or more processors, or in a combination of the two. A software module can reside in RAM, flash memory, ROM, EPROM, EEPROM, registers, a hard disk, a removable disk, a CD-ROM, a DVD-ROM or any other form of non-transitory computer-readable storage medium, media, or physical computer storage known in the art. An example storage medium can be coupled to the processor such that the processor can read information from, and write information to, the storage medium. In the alternative, the storage medium can be integral to the processor. The storage medium can be volatile or nonvolatile. The processor and the storage medium can reside in an ASIC. The ASIC can reside in a user terminal. In the alternative, the processor and the storage medium can reside as discrete components in a user terminal.

Disjunctive language such as the phrase "at least one of X, Y, or Z," or "at least one of X, Y and Z," unless specifically stated otherwise, is otherwise understood with the context as used in general to present that an item, term, etc., may be either X, Y, or Z, or any combination thereof (e.g., X, Y, and/or Z). Thus, such disjunctive language is not generally intended to, and should not, imply that certain implementations require at least one of X, at least one of Y, or at least one of Z to each be present.

Unless otherwise explicitly stated, articles such as "a" or "an" should generally be interpreted to include one or more described items. Accordingly, phrases such as "a device configured to" are intended to include one or more recited devices. Such one or more recited devices can also be collectively configured to carry out the stated recitations. For example, "a processor configured to carry out recitations A, B and C" can include a first processor configured to carry out recitation A working in conjunction with a second processor configured to carry out recitations B and C.

Language of degree used herein, such as the terms "about," "approximately," "generally," "nearly" or "substantially" as used herein, represent a value, amount, or characteristic close to the stated value, amount, or characteristic that still performs a desired function or achieves a desired result. For example, the terms "about," "approximately," "generally," "nearly" or "substantially" may refer to an amount that is within less than 10% of, within less than 5% of, within less than 1% of, within less than 0.1% of, and within less than 0.01% of the stated amount.

Although the invention has been described and illustrated with respect to illustrative implementations thereof, the foregoing and various other additions and omissions may be made therein and thereto without departing from the spirit and scope of the present disclosure.

What is claimed is:

1. A computer-implemented method to construct an occupancy map of an environment, comprising:
   receiving a historical occupancy map, the historical occupancy map indicating that a first object is not located at a first location and a second object is located at a second location;
   determining, based on first sensor information, a detection of the first object at the first location;
   determining, based on second sensor information, a non-detection of the second object at the second location;
   determining an objective function to apply in constructing the occupancy map;
   determining, based at least in part on the first sensor information and the objective function, a first confidence score associated with the detection of the first object at the first location;
   determining, based at least in part on the second sensor information and the objective function, a second confidence score associated with the non-detection of the second object at the second location; and
   constructing the occupancy map to include an indication that:
      the first object is located at the first location based on a first comparison between the first confidence score and a threshold object presence indicator associated with the first location, and
      the second object is not located at the second location based on a second comparison between the second confidence score and a threshold object absence indicator associated with the second location.

2. The computer-implemented method of claim 1, wherein the objective function includes a default instruction to prioritize collision avoidance.

3. The computer-implemented method of claim 1, wherein the objective function includes a first weight in determining the first confidence score and a second weight in determining the second confidence score.

4. The computer-implemented method of claim 3, wherein the first weight is based at least in part on:
   an input type of the first sensor information,
   an object type of the first object, and
   an object dynamic of the first object; and,
wherein the second weight is based at least in part on:
   an input type of the second sensor information,
   an object type of the second object, and
   an object dynamic of the second object.

5. The computer-implemented method of claim 1, wherein the threshold object presence indicator and the threshold object absence indicator are determined at least in part by the objective function, and wherein a magnitude of the threshold object presence indicator is smaller than a magnitude of the threshold object absence indicator.

6. A computer-readable medium having computer-executable instructions stored thereon, which, when executed by a processor of a computing system, cause the computing system to at least:
   receive a plurality of object information;
   determine, based on the plurality of object information, that a first object is located at a first location;

determine, based on the plurality of object information, that the first object is not located at the first location;

determine, based at least in part on the plurality of object information and an objective function, a first confidence score associated with the determination that the first object is located at the first location and a second confidence score associated with the determination that the first object is not located at the first location; and apply the objective function to construct an occupancy map based on a comparison of the first confidence score with the second confidence score, to include one of:
 a first indication that the first object is located at the first location, or
 a second indication that the first object is not located at the first location.

7. The computer-readable medium of claim 6, wherein the objective function includes a default instruction to prioritize collision avoidance.

8. The computer-readable medium of claim 6, wherein the plurality of object information includes at least one sensor information and a historical occupancy map information.

9. The computer-readable medium of claim 6, wherein the objective function includes a first weight used in determining the first confidence score and a second weight used in determining the second confidence score.

10. The computer-readable medium of claim 9, wherein the first weight and the second weight are based at least in part on at least one of:
 an information type of the plurality of object information,
 an object type of the first object,
 an object dynamic of the first object,
 a number of sensor information included in the plurality of object information, or
 a risk assessment of a potential collision.

11. The computer-readable medium of claim 6, wherein the occupancy map includes:
 the first indication that the first object is located at the first location if the comparison of the first confidence score with the second confidence score exceeds a threshold object presence indicator, or
 the second indication that the first object is not located at the first location if the comparison of the first confidence score with the second confidence score does not exceed the threshold object presence indicator.

12. The computer-readable medium of claim 11, wherein the threshold object presence indicator is determined at least in part by the objective function.

13. The computer-readable medium of claim 6, wherein the determination that the first object is not located at the first location is determined based on a historical occupancy map and the determination that the first object is located at the first location is determined based on sensor information.

14. The computer-readable medium of claim 6, wherein the determination that the first object is located at the first location is determined based on a historical occupancy map and the determination that the first object is not located at the first location is determined based on sensor information.

15. The computer-readable medium of claim 14, wherein the plurality of object information includes sensor information from at least two sensors, and the determination that the first object is not located at the first location is determined based on the sensor information from the at least two sensors.

16. An aerial vehicle apparatus, comprising:
 a first sensor configured to detect objects in a field of view and generate first detection information;
 a control system including a processor and program instructions that, when executed by the processor, cause the processor to at least:
  receive a historical occupancy map of the field of view;
  determine, based on the historical occupancy map, an anticipated presence of a first object at a location within the field of view;
  determine, based on the first detection information, a non-detection of the first object at the location;
  determine an objective function to construct an occupancy map;
  determine, based at least in part on the objective function, a first confidence score associated with the non-detection of the first object at the location; and
  construct the occupancy map, based on the first confidence score, to include one of:
   a first indication that the first object is not located at the location, or
   a second indication that the first object is located at the location.

17. The aerial vehicle apparatus of claim 16, further comprising a second sensor configured to detect objects in the field of view and generate second detection information, and wherein the program instructions include further instructions that, when executed by the processor, cause the processor to at least:
 determine, based on the second detection information, the non-detection of the first object at the location,
 determine, based on the first detection information and the second detection information, a second confidence score associated with the non-detection of the first object at the location, and
 construct the occupancy map, based on the second confidence score, to include one of:
  the first indication that the first object is not located at the location, or
  the anticipated presence of the first object at the location.

18. The aerial vehicle apparatus of claim 16, wherein the objective function includes a weight used in determining the first confidence score.

19. The aerial vehicle apparatus of claim 18, wherein the weight is based at least in part on a sensor type of the first sensor, an object type of the first object, an object dynamic of the first object, and the first detection information.

20. The aerial vehicle apparatus of claim 16, wherein the objective function includes a default instruction to prioritize collision avoidance.

* * * * *